United States Patent
Yu et al.

(10) Patent No.: US 8,712,477 B2
(45) Date of Patent: Apr. 29, 2014

(54) MOBILE TERMINAL AND METHOD FOR CHANGING PAGE THEREOF

(75) Inventors: Jaehwa Yu, Incheon (KR); Hyuntak Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 109 days.

(21) Appl. No.: 13/210,724

(22) Filed: Aug. 16, 2011

(65) Prior Publication Data

US 2012/0165076 A1   Jun. 28, 2012

(30) Foreign Application Priority Data

Dec. 24, 2010   (KR) .......................... 10-2010-0134888
Dec. 24, 2010   (KR) .......................... 10-2010-0134889

(51) Int. Cl.
| H04M 1/00 | (2006.01) |
| G06F 3/00 | (2006.01) |
| G06F 3/0483 | (2013.01) |
| G06F 3/0488 | (2013.01) |

(52) U.S. Cl.
CPC ............ *G06F 3/0483* (2013.01); *G06F 3/0488* (2013.01)
USPC .......................... 455/566; 715/762; 715/864

(58) Field of Classification Search
CPC .... G06F 3/0481; G06F 3/0483; G06F 3/0488
USPC .......... 455/566; 715/700, 762, 765, 853, 863, 715/864; 345/158, 173
See application file for complete search history.

(56) References Cited

U.S. PATENT DOCUMENTS

| 6,741,268 | B1 * | 5/2004 | Hayakawa .................... 715/777 |
| 7,940,250 | B2 * | 5/2011 | Forstall ......................... 345/173 |
| 8,375,321 | B2 * | 2/2013 | Moreno et al. ................ 715/777 |
| 2009/0064055 | A1 | 3/2009 | Chaudhri et al. ............. 715/863 |
| 2009/0197635 | A1 | 8/2009 | Kim et al. .................. 455/550.1 |
| 2011/0271182 | A1 * | 11/2011 | Tsai et al. ..................... 715/702 |
| 2012/0084692 | A1 * | 4/2012 | Bae .............................. 715/769 |

FOREIGN PATENT DOCUMENTS

| CN | 101419621 | 4/2009 |
| CN | 101821707 | 9/2010 |

OTHER PUBLICATIONS

European Search Report dated Mar. 12, 2012 issued in Application No. 11 17 6897.
Chinese Office Action issued in related Application No. 201110297618.5 dated Dec. 27, 2013.

* cited by examiner

*Primary Examiner* — Duc M Nguyen
(74) *Attorney, Agent, or Firm* — Ked & Associates, LLP

(57) ABSTRACT

A mobile terminal for smoothly changing a page between page groups by using an indicator indicating a page group, and a method for changing a page in the mobile terminal are provided. The mobile terminal including: a display unit configured to display an indicator indicating a page group including a plurality of pages; an input unit configured to detect a gesture associated with the indicator; and a controller configured to control the display unit to display a page representing the page group, wherein the indicator discriminately displays the page representing the page group among the plurality of pages.

20 Claims, 21 Drawing Sheets

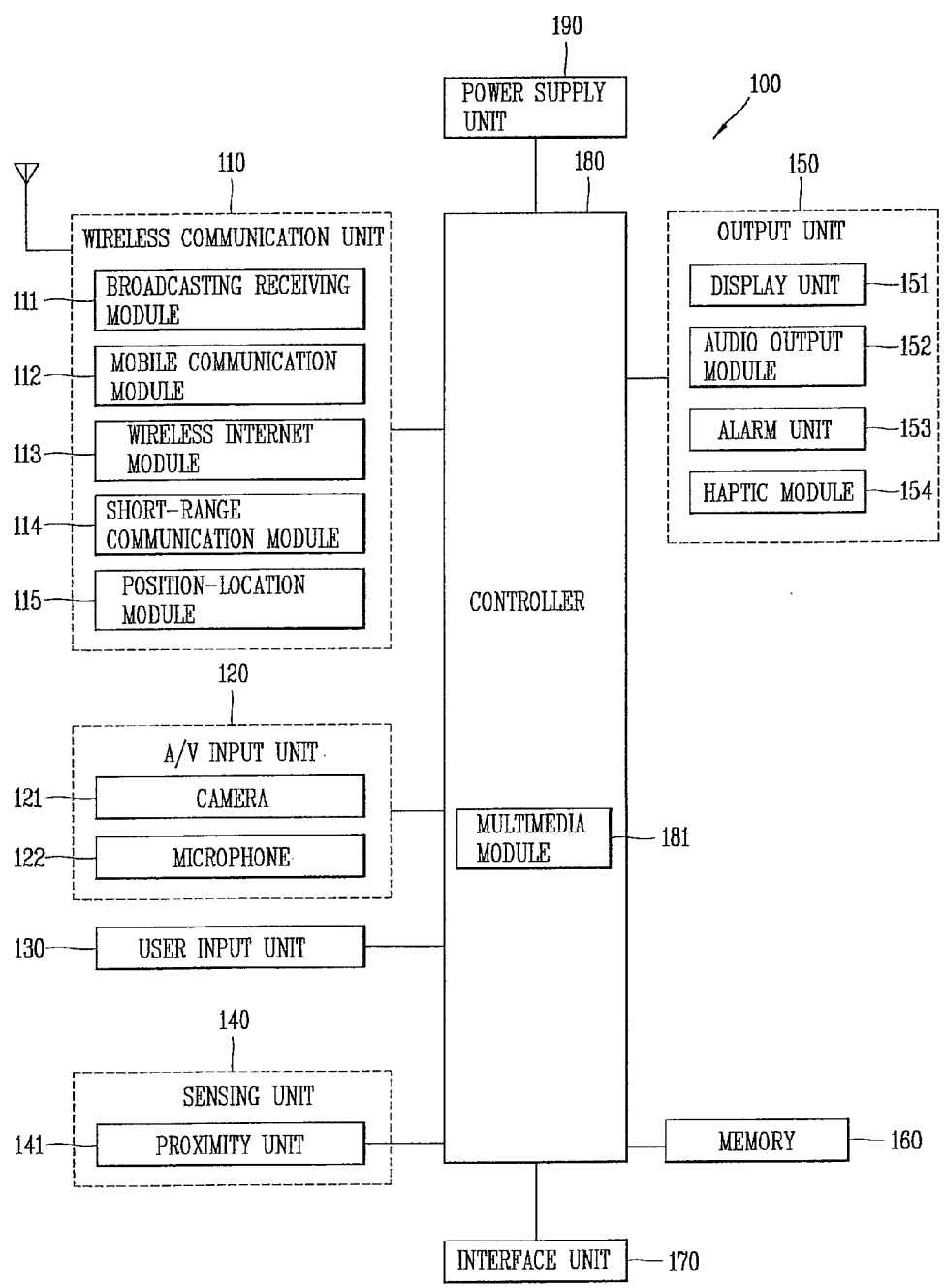

MOBILE TERMINAL AND METHOD FOR CHANGING PAGE THEREOF

CROSS REFERENCE TO RELATED APPLICATIONS

The present application claims priority to Korean Application No. 10-2010-0134888 filed in Korea on Dec. 24, 2010 and Korean Application No. 10-2010-0134889 filed in Korea on Dec. 24, 2010, the entire contents of which is hereby incorporated by reference in its entirety.

BACKGROUND OF THE INVENTION

1. Field of the Invention

The present invention relates to a mobile terminal and a method for controlling an operation of a mobile terminal and, more particularly, to a mobile terminal having a page dividing function and a method for changing a page in the mobile terminal.

2. Description of the Related Art

In general, terminals may be divided into a mobile terminal and stationary terminal according to whether or not terminals are movable. In addition, mobile terminals may be divided into a handheld terminal and a vehicle mount terminal according to whether or not users can directly carry it around.

As such functions become more diversified, consideration of the convenience of user interfaces (UIs) including an application execution function, or the like, is requested.

SUMMARY OF THE INVENTION

Accordingly, an object of the present disclosure is to provide a mobile terminal capable of smoothly changing pages in page groups by using an indicator indicating a page group, and a method for changing a page in the mobile terminal.

In order to obtain the above object, there is provided a mobile terminal including: a display unit configured to display an indicator indicating a page group including a plurality of pages; an input unit configured to detect a gesture associated with the indicator; and a controller configured to control the display unit to display a page representing the page group, wherein the indicator discriminately displays the page representing the page group among the plurality of pages.

The page representing the page group may be a page which has been most recently displayed among the plurality of pages.

The indicator may include a plurality of indicators representing each of the plurality of pages.

The indicator may reflect the position of each of the plurality of pages.

The detected gesture may be a tap or a long press gesture with respect to the indicator.

The controller may control the display unit to display the indicator in a magnified or extended manner in response to the detected gesture.

The input unit may detect a second gesture associated with the magnified or extended indicator, and the controller may control the display unit to display a page associated with the detected second gesture in response to the detected second gesture.

The detected gesture may be a drag, flick, or a swipe gesture in an area in which the indicator is displayed.

The indicator may include a discriminator discriminating each page group.

The mobile terminal may further include: a sensing unit configured to sense a tilt of the mobile terminal, and the controller may control the display unit to display the plurality of pages based on the detected tilt.

The controller may control the display unit to display a second page included in a second page group along with the indictor.

The gesture may be further associated with an object included in the second page, and the controller may control the display unit to display the object such that it is included in a page which represents the page group.

In order to obtain the above object, there is also provided a method for changing a page of a mobile terminal, including: displaying an indicator indicating a page group including a plurality of page groups; detecting a gesture associated with the indicator; and displaying a page representing the page group in response to the detected gesture, wherein the indicator discriminately displays the page representing the page group among the plurality of pages.

The page representing the page group may be a page which has been most recently displayed among the plurality of pages.

The indicator may include a plurality of indicators representing the plurality of pages, respectively.

The indicator may reflect the position or order of each of the plurality of pages.

The displaying of the page representing the page group may include displaying the indicator in a magnified or extended manner in response to the detected gesture.

The displaying of the page representing the page group may further include: detecting a second gesture in the magnified or extended indicator; and displaying a page associated with the detected second gesture in response to the detected second gesture.

The displaying of the indicator may include: displaying a second page included in a second page group along with the indicator.

The gesture may be further associated with an object included in the second page, and the displaying of the page representing the page group may include: displaying the object such that it is included in the page representing the page group in response to the detected gesture.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 1 is a schematic block diagram of a mobile terminal according to an embodiment of the present invention;

DETAILED DESCRIPTION OF THE INVENTION

Figure 2A:
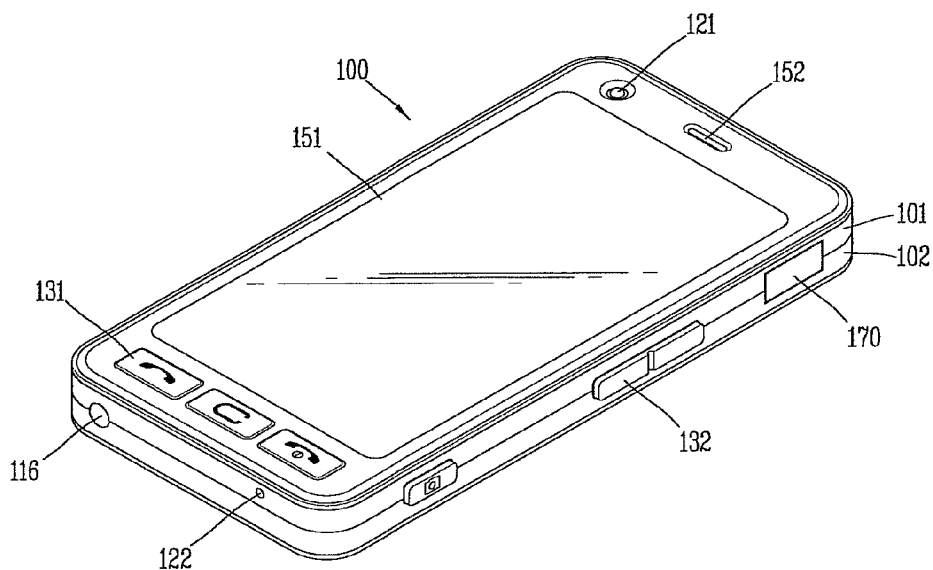
FIG. 2A is a front perspective view of the mobile terminal according to an embodiment.

Reference will now be made in detail to the preferred embodiments of the present invention, examples of which are illustrated in the accompanying drawings.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcasting receiving module 111, a mobile communication module 112, a wireless Internet module 113, a short-range communication module 114, and a position-location module 115.

The broadcasting receiving module 111 receives broadcast signals and/or broadcast associated information from an external broadcast management server (or other network entity) via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcasting receiving module 111 may be configured to receive signals broadcast by using various types of broadcast systems. In particular, the broadcasting receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcasting receiving module 111 may be configured to be suitable for every broadcast system that provides a broadcast signal as well as the above-mentioned digital broadcast systems.

Broadcast signals and/or broadcast-associated information received via the broadcasting receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The position-location module 115 is a module for acquiring the location (or position) of the mobile terminal, and a typical example of the position-location module is a GPS (Global Positioning System).

With reference to FIG. 1, the A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate input data from commands entered by a user to control various operations of the mobile terminal. The user input unit 130 may include a keypad, a dome switch, a touch pad (e.g., a touch sensitive member that detects changes in resistance, pressure, capacitance, etc. due to being contacted) a jog wheel, a jog switch, and the like.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. Meanwhile, the sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module, and the like.

The display unit 151 may display (or output) information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of them may be configured to be transparent to allow viewing of the exterior therethrough, which may be called transparent displays. A typical transparent display may be, for example, a TOLED (Transparent Organic Light Emitting Diode), or the like. The rear structure of the display unit 151 may include the light-transmissive structure. With such a structure, the user can view an object located at a rear side of the terminal body through the region occupied by the display unit 151 of the terminal body.

The mobile terminal 100 may include two or more display units according to its embodiment. For example, a plurality of display units may be separately or integrally disposed on one surface or disposed on both surfaces of the mobile terminal, respectively.

Meanwhile, when the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc.

The touch sensor may be configured to convert a pressure applied to a particular portion of the display unit 151 or a change in capacitance at a particular portion of the display unit 151 into an electrical input signal. The touch sensor may be configured to detect the pressure when a touch is applied, as well as a touched position or area.

When a touch with respect to the touch sensor is inputted, corresponding signal (signals) are transmitted to a touch controller. The touch controller processes the signal (signals) and transmit corresponding data to the controller 180. Thus, the controller 180 can recognize which portion of the display unit 151 has been touched.

With reference to FIG. 1, the proximity sensor 141 may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs in relation to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

FIG. 2A is a front perspective view of the mobile terminal according to an embodiment of the present invention.

The mobile terminal has a bar type terminal body. However, the present invention is not limited thereto and may be applicable to a slide type mobile terminal, a folder type mobile terminal, a swing type mobile terminal, a swivel type mobile terminal, etc, in which two or more bodies are combined to be relatively movable.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130, 131, 132, the microphone 122, the interface unit 170, etc. may be disposed mainly on the front case 101.

The display unit 151 occupies the most portion of a circumferential surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102.

The user input unit 130 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 32 may receive a command such as controlling of the size of a sound outputted from the audio output unit 152 or conversion into a touch recognition mode of the display unit 151.

Figure 2B:
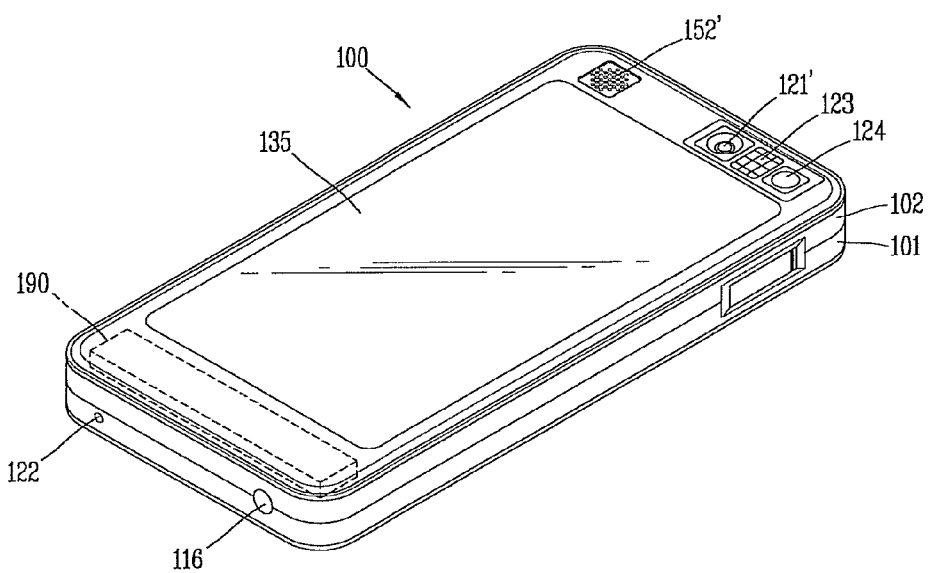
FIG. 2B is a rear perspective view of the mobile terminal illustrated in FIG. 2A.

FIG. 2B is a rear perspective view of the mobile terminal as shown in FIG. 2A.

With reference to FIG. 2B, a camera 121' may additionally be disposed on the rear surface of the terminal body, namely, on the rear case 102. The camera 121' may have an image capture direction which is substantially opposite to that of the camera 121 (See FIG. 2A), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to see himself when he wants to capture his own image (i.e., self-image capturing) by using the camera 121'.

An audio output unit 152' may be additionally disposed on the rear surface of the terminal body. The audio output module 152' may implement stereophonic sound functions in conjunction with the audio output module 152 (See FIG. 2A) and may be also used for implementing a speaker phone mode for call communication.

A broadcast signal receiving antenna 124 may be disposed at the side of the terminal body, in addition to an antenna that is used for mobile communications. The antenna 124 constituting a portion of the broadcasting receiving module 111 (See FIG. 1) can also be configured to be retractable from the terminal body.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151.

In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

Embodiments of the present invention in relation to the terminal configured as described above will now be described in detail. The embodiments described hereinafter may be used alone or may be combined to be used. Also, the embodiments described hereinafter may be combined with the foregoing user interface so as to be used.

Embodiments disclosed in the present document may be implemented by the mobile terminal 100 as described above with reference to FIGS. 1 to 2B.

A method for changing a page of a mobile terminal and the operation of the mobile terminal 100 for implementing the same will now be described in detail with reference to FIGS. 3 to 10B.

The controller 180 may obtain an application from an external device or an application providing server by controlling the wireless communication unit 110 or the interface unit 170. Also, the controller 180 may store and install the obtained application in the memory 160. When the application is installed, the memory 160 may store a program and data of the application, and the controller 180 may manage the installation information of the application. Also, when the application is installed, the controller 180 may generate an object set to execute the installed application and store the generated object in the memory 160.

When an idle screen display request is received, the controller 180 may control the display unit 151 to display an idle screen (or a standby screen) including at least one object stored in the memory 160. The object displayed on the idle screen may be selected through the user input unit 130, and when the object is selected, an application corresponding to the selected object may be executed.

In the mobile terminal 100 in which the controller 180 supports multitasking in a scheme of sharing common processing resources, the controller 180 may execute a plurality of applications through task scheduling. Namely, while executing a first application in a foreground area (i.e., activated state), the controller 180 may execute a second application in a background area (i.e., deactivated state).

The user input unit 130 may detect various gestures by using a touch sensor. The gesture may include tapping, dragging, flicking, swiping, double tapping, and touch & hold gestures, using fingers, stylus, or the like.

The tapping gesture is a basic gesture for touching a user interface element of a screen. Namely, it refers to a motion of bring fingers or a stylus to a touch screen for a short period of time, which equivalent to a motion of single click by mouse. A touch motion, a long press motion may refer to the same motion.

The dragging gesture refers to a motion of scrolling the screen in a touched state a particular direction. For example, the dragging gesture may be used when the screen is scrolled up and down in a user interface element available for scrolling.

The flicking gesture refers to a gesture of removing fingers or stylus from the touch screen within a short time in making the dragging gesture. For example, the flicking gesture may be used in quickly scrolling the screen up and down in the scroll-available user interface element.

The swiping gesture refers to a gesture of strongly dragging fingers or stylus on the touch screen in making the dragging gesture. For example, the dragging gesture may be used in displaying a concealed deletion menu corresponding to each item on a list.

The double tapping gesture refers to a two successive tap motions. For example, the double tap gesture may be used to zoom in content or an image so as to place it at the center or zoom out content or an image.

The touch and hold gesture refers to a motion of maintaining fingers or stylus for a certain period of time while the fingers or stylus are/is in contact with the touch screen. The touch and hold gesture may be also called a long press. The touch and hold gesture is used for a function of displaying a magnified view with respect to a location of a cursor in text which can be edited.

Meanwhile, the touch screen of the mobile terminal 100 may recognize a multi-touch. In this case, the gesture may further include a pinch open gesture and a pinch close gesture.

The pinch open gesture refers to a gesture of opening two fingers in a state of being in contact with the touch screen just like a screen image is stretched. The pinch open gesture is used in zooming in a map image on a map view. Compared with the double tap gesture which is used to automatically perform zooming in by a predetermined magnification, the pinch open gesture is used to adjust a zoom-in level based on the amount in which the user opens his fingers.

The pinch close gesture, a reverse gesture of the pinch open gesture, refers to a gesture of narrowing two fingers in a state of being in contact with the touch screen just like a screen image is narrowed. For example, the pinch open gesture is used to zoom out a map image in a map view.

In an embodiment of the present invention, a gesture may be performed on an area in which a user interface element (graphic object) is not displayed. For example, the user may perform horizontal or vertical swiping which passes through an empty area of the screen of the mobile terminal. In a different embodiment of the present invention, the user may touch or tap an upper, lower, left, or right portion of an empty area on the screen. In a different embodiment of the present invention, a navigation guide (or indicator) may be displayed on the screen. The user may touch or drag (flick or swipe) the area of the indicator.

A gesture for selecting an object may be a gesture of touching or tapping an object. When the user input unit 130 detects the gesture of touching or tapping an object, the controller 180 may execute an application corresponding to the object.

A gesture for selecting a different object may be a gesture of long pressing (which means a touch or a tap during a certain period of time) an object. When the user input unit 130 detects a gesture of long pressing an object, the controller 180 may provide a user interface allowing for managing of the object or an application corresponding to the object. Examples of the user interface may include shifting, deleting, or the like, of the object.

A plurality of objects may form an object group. An object group may be one object or may include a plurality of objects. For example, an object group may include an object and a different object group. Types of gestures which can be applicable to an object group may be the same as a gesture which can be applicable to an object. When an object is selected, a corresponding application may be executed, while when an object group is selected, an object or a different object group included in the selected object group may be displayed.

The plurality of objects may constitute a page. A page refers to a view on a display. Namely, a page is a unit for displaying one or more objects on the display, and the one or more objects may be associated or may not be associated. A plurality of pages may exist, and the plurality of pages may be approached (or accessed) by a page indicator. Namely, each of the pages can be arbitrarily changed from one to another by a gesture of tapping the page indicator.

Conceptionally one-dimensional pages may be accessed by a one-dimensional gesture. Namely, pages can be sequentially accessed by a horizontal or vertical dragging (flicking or swiping) gesture (sequential accessing scheme). In comparison, conceptionally multi-dimensional pages may be accessed by multi-dimensional dragging (flicking or swiping) gestures. For example, two-dimensional pages may be sequentially accessed by a horizontal or vertical dragging (flicking or swiping) gesture. Pages accessible by one-dimensional dragging (flicking or swiping) gesture may form a page group.

Figure 3A:
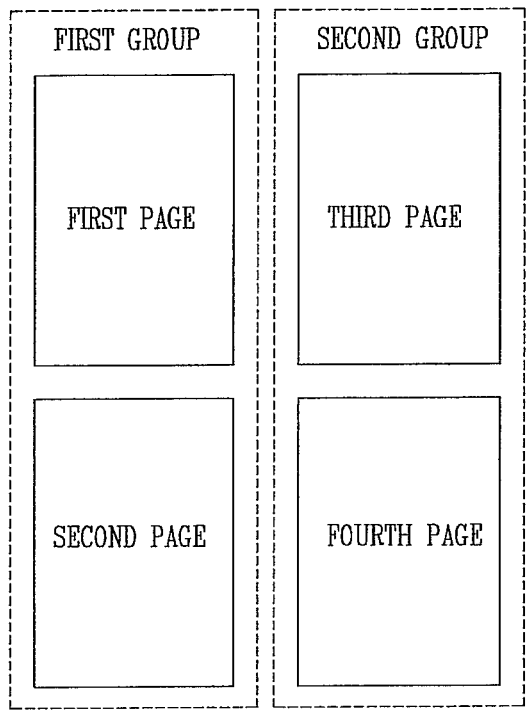
FIG. 3A is a conceptual view of a page group according to an embodiment of the present invention.

FIG. 3A is a conceptual view of a page group according to an embodiment of the present invention.

In the sequential accessing scheme, two pages included in the same page group may be changed by a horizontal or vertical dragging (flicking or swiping) gesture, while two pages included in different page groups may not be changed by a dragging (flicking or swiping) gesture.

For example, in FIG. 3A, in a page dividing scheme in which conceptionally two-dimensional pages are formed, a plurality of pages which can be changed by a vertical page dragging (flicking or swiping) gesture may form a page group, respectively. Namely, the first and second pages are included in a first group, and the first and second pages can be changed by a vertical page dragging (flicking or swiping) gesture. Also, third and fourth pages are included in a second group, and the third and fourth pages can be changed by a vertical page dragging (flicking or swiping) gesture.

Meanwhile, the first and third pages (or second and fourth pages) included in different page groups may be changed by a horizontal page dragging (flicking or swiping) gesture. However, the first and fourth pages or the second and third pages cannot be change by a page dragging (flicking or swiping) gesture in either vertical or horizontal direction.

This problem may be severe when each page group includes a larger number of pages. Also, it may be impossible to display an indicator for changing a great number of pages in each page due to the limitation in the size of the display of the mobile terminal 100.

Figure 3B:
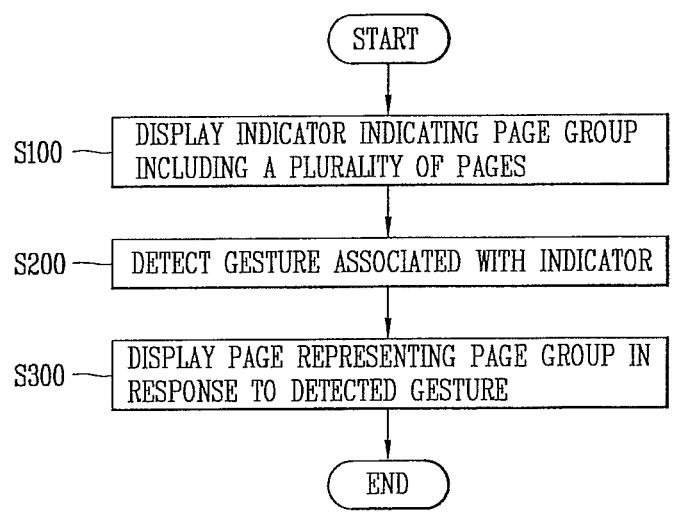
FIG. 3B is a flow chart illustrating a process of changing a page according to an embodiment of the present invention.

FIG. 3B is a flow chart illustrating a process of changing a page according to an embodiment of the present invention.

The display unit 151 may display an indicator indicating a page group including a plurality of pages (step S100). The display unit 151 may display one of the plurality of pages on the screen. As described above, at least one of objects may be included in the page displayed on the screen. Also, the controller 180 may generate an indicator indicating each of the page group and display the generated indicators on the screen.

Here, the display unit 151 may generate indicators indicating some of page groups, respectively, and may display the generated indicators indicating the some of the pages groups. For example, an indicator with respect to a page group including a page currently displayed on the screen and an indicator with respect to two page groups adjacent to the page group.

The indicators indicating each of the page groups may include indicators with respect to a plurality of pages included in each of the page groups. Also, indicators indicating the respective page groups may reflect the position of each of the plurality of pages included in the respective page groups.

Also, the indicator indicating the page group may discriminately display pages each representing the page groups among the plurality of pages included in each of the page groups. Here, the pages each representing the page groups may be pages most recently (or later) displayed among the plurality of pages included in each of the page groups. According to an implementation example, the pages each representing the page groups may be pages which have been most frequently displayed among the plurality of pages included in each of the page groups, pages which are positioned first or last, pages previously designated by a user, or the like.

Also, here, the controller 180 may generate indicators with respect to some of pages included in each of the page groups, and display the generated indicators indicating some of the generated indicators indicating some of the pages. For example, the controller 180 may display indicators each indicating two pages closest to the page which has been most recently displayed in each of the page groups including the indicator indicating the page which has been most recently displayed.

The user input unit 130 may detect a gesture associated with an indicator (step S200). The gesture associated with the indicator may include a tapping gesture with respect to the indicator, a long press gesture with respect to the indicator, a dragging (flicking or swiping) gesture with respect to the indicator or an indicator area.

In response to the detected gesture, the controller 180 may control the display unit 151 to display the page representing the page group. First, the controller 180 may identify the page group corresponding to the indicator associated with the detected gesture based on the gesture detected by the user input unit 130. Also, the controller 180 may check the page representing the identified page group. The page representing the identified page group may be a page representing the page group described in step S100.

When the controller 180 checks the page representing the identified page group, the controller 180 may control the display unit 151 to display the checked page on the screen. Accordingly, the page displayed on the screen may be changed from a first page included in a first page group to a second page included in a second page group.

Meanwhile, as the displayed page is changed, the displaying of the indicators each indicating each of the page groups. The position of the indicator indicating the second page group may be moved to a previous position of the indicator indicating the first page group. Accordingly, the position of a different indicator may be adjusted based on the new position of the indicator representing the second page group. For example, the indicator with respect to the second page group and the indicators with respect to the two page groups adjacent to the second page group may be displayed on the screen.

Figure 4A:
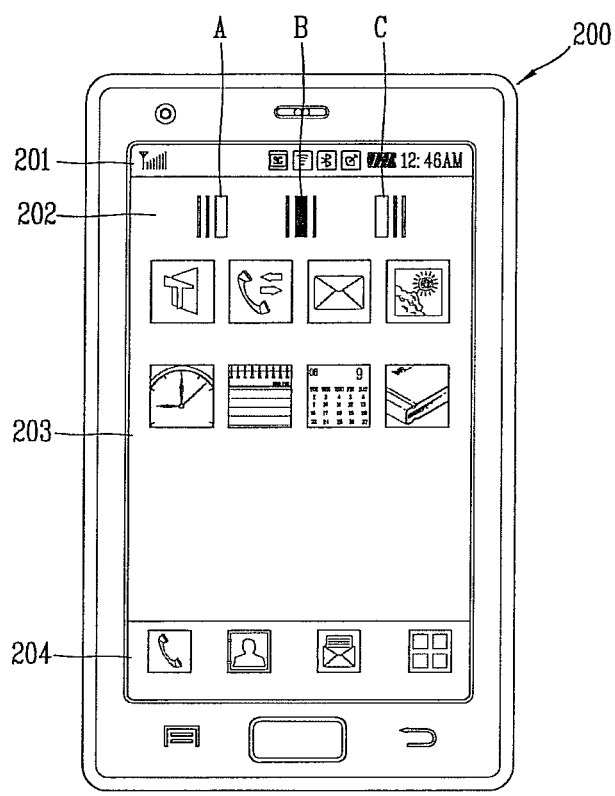
FIGS. 4A to 4C are overviews of display screens illustrating a process of changing a page according to a first embodiment of the present invention.
Figure 4B:
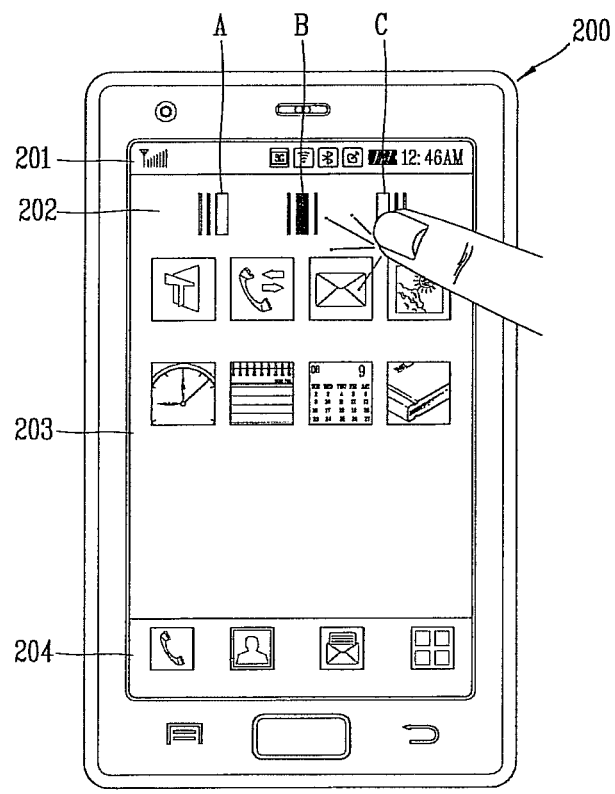
Figure 4C:
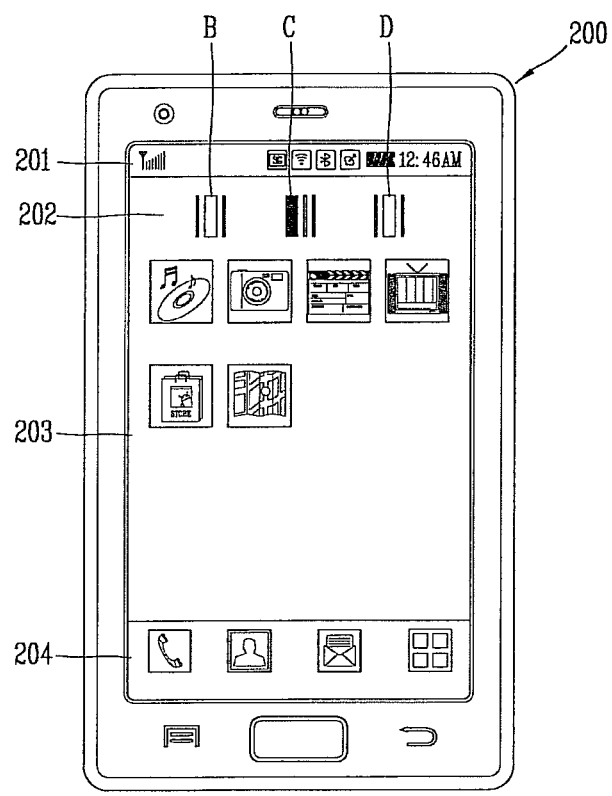

FIGS. 4A to 4C are overviews of display screens illustrating a process of changing a page according to a first embodiment of the present invention.

As shown in FIG. 4A, a screen 200 of the mobile terminal 100 may include an area 201 displaying status information of the mobile terminal 100, an indicator display area 202, a page display area 203, and a fixed object display area 204.

The area 201 displaying status information of the mobile terminal 100 may display at least one indicator indicating communication information of the mobile terminal 100, an indicator representing time information of the mobile terminal 100, an indicator representing battery information of the mobile terminal 100, or the like.

The indicator display area 202 may be displayed to overlap with the page display area 203 or may be displayed to be adjacent to the page display area 203. At least one indicator indicating each page group may be displayed on the indicator display area 202. As described above, only indicators each indicating some page groups may be displayed on the indicator display area 202. Also, indicators (A, B, or C) indicating each of the page groups may include indicators indicating pages included in each of the page groups.

In an embodiment of the present invention, the display unit 151 may display a discriminator discriminating the indicators each indicating the page groups. For example, the discriminator may be a blank.

Also, in an embodiment of the present invention, indicators may reflect relative positions among a plurality of pages included in each of the corresponding page groups. For example, the indicators (A, B, or C) may include three indicators indicating a page. In this case, the indicator of a page positioned left-most or upper-most area in a page group may be positioned at the left side in each indicator (A, B, or C). Also, an indicator of a page positioned at the right-most area or lower-most area in a page group may be positioned at the right side in each indicator (A, B, and C). In this case, the indicator of the page positioned at the center in the page group may be positioned at the center of each indicator (A, B, or C).

Also, an embodiment of the present invention, an indicator may display a page representing each page group among a plurality of pages included in a corresponding page group such that it is discriminated from the other pages. For example, in the indicator A, an indicator indicating a right page, an indicator indicating a middle page in the indicator B, and an indicator indicating a left page in the indicator C may be displayed to be discriminated from indicators indicating other pages of each page group.

When a gesture associated with an indicator indicating a page group is detected through the user input unit 130, the controller 180 may determine a page corresponding to the page indicator displayed to be discriminated from other page indicators, as a page to be displayed on the screen.

Also, an indicator indicating a page displayed on the current page display area 203 may be displayed to be discriminated from an indicator indicating a different page. This is to discriminate the page displayed on the current page display area 203 from a different page.

The page display area 203 may display a page including at least one object. For example, a page corresponding to an indicator indicating a middle page displayed to be discriminated from an indicator indicating a different page in the indicator B indicating a page group may be displayed on the page display area 203.

The fixed object display area 204 may display objects which are fixedly displayed irrespective of a page change. For example, objects set to execute frequently used applications such as a call application, a contact number application, a mail application, a setting application, or the like, may be displayed on the fixed object display area 204.

With reference to FIG. 4B, in a state in which one page included in a page group corresponding to the indicator B is displayed on the page display area 203, the user 103 may detect a gesture associated with the indicator C indicating one page group displayed on the indicator display area 202. The gesture associated with the indicator C may include a tapping gesture of the indicator C.

When the user input unit 130 detects the tapping gesture of the indicator C, the controller 180 may identify a page group corresponding to the indicator C in which the tapping gesture was detected, and check a page (page representing the identified page group) to be displayed on the page display area 203 in the identified page group.

With reference to FIG. 4C, the controller 180 may control the display unit 151 to display the checked page on the page display area 203. For example, the display unit 151 may display a page corresponding to a left page indicator displayed to be discriminated from a different page indicator in the indicator C in FIG. 4B on the page display area 203.

At the same time, when the page indicator indicating the page currently displayed on the page display area 203 may be displayed to be discriminated from a page indicator displayed to be discriminated from a different page indicator in a different page group Accordingly, as the indicator A is moved to the left, the page indicator indicating the previously displayed page may be displayed in the same manner as the page indicator displayed to be discriminated from the different page indicator included in the different indicator.

Meanwhile, according to the movement of the indicators B and C, a new indicator D may be displayed. A page group corresponding to the new indicator D may be a page group adjacent to the indicator C. Also, according to the movement of the indicators B and C, the previously displayed indicator A may not be displayed on the screen 200 any longer.

Figure 5A:
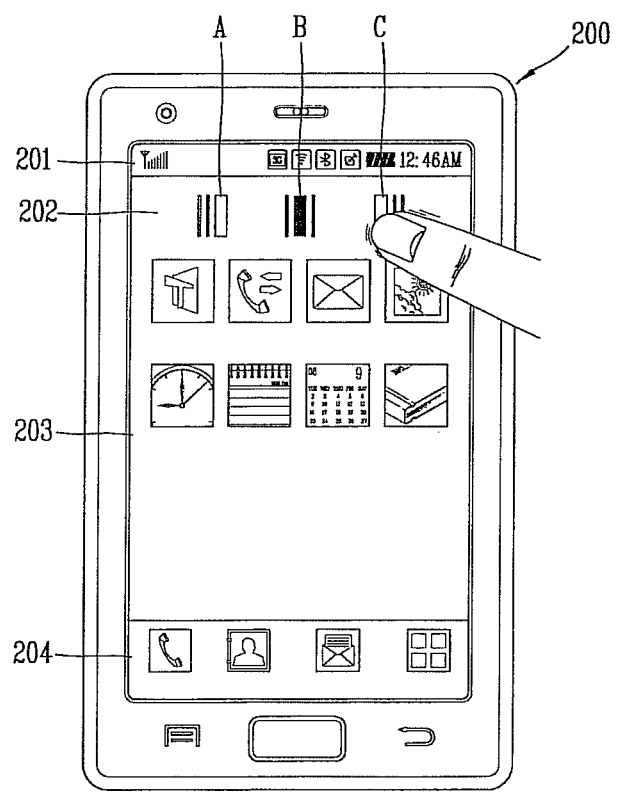
FIGS. 5A to 5C are overviews of display screens illustrating a process of changing a page according to a second embodiment of the present invention.
Figure 5B:
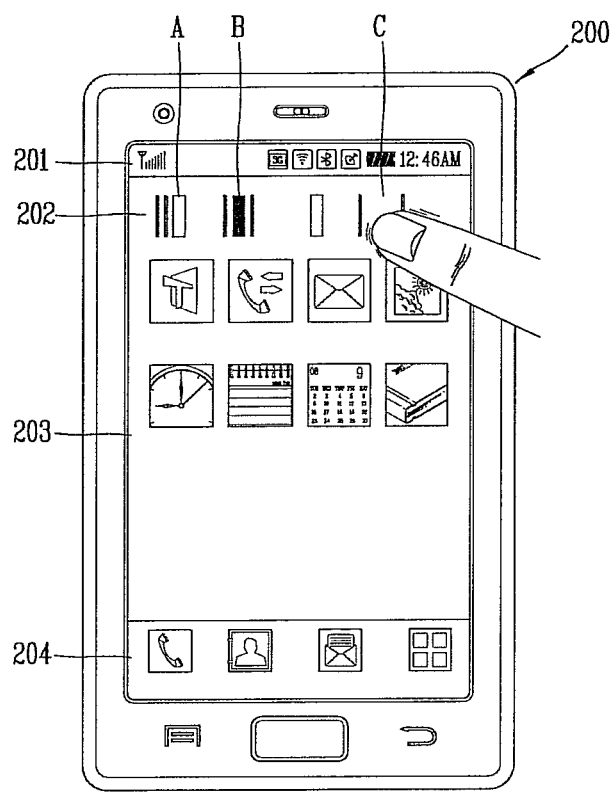
Figure 5C:
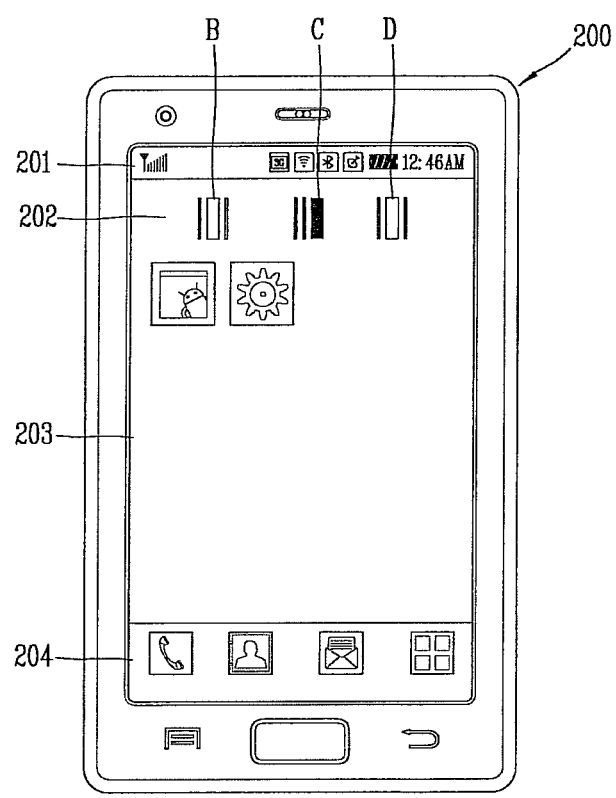

FIGS. 5A to 5C are overviews of display screens illustrating a process of changing a page according to a second embodiment of the present invention.

With reference to FIG. 5A, the user input unit 130 may detect a long press gesture of the indicator C. When the user input unit 130 detects a long press gesture of the indicator C, the controller 180 may identify a page group corresponding to the indicator C.

With reference to FIG. 5B, when the user input unit 130 detects the long press gesture of the indicator C, the controller 180 may control the display unit 151 to display the indicator in a magnified or extended manner. For example, the indicator C may include a plurality of page indicators, and the size of the page indicators may be magnified or the interval between the page indicators may be extended. This is to allow the user to easily apply a gesture of tapping or long pressing any one of the page indicators to the mobile terminal.

In an embodiment of the present invention, if indicators indicating pages included in the page group corresponding to the indicator C are not all displayed on the indicator area 201, when the user input unit 130 detects a long press gesture of the indicator C, page indicators which have not been previously displayed may be displayed on the indicator area 201.

In this manner, in the state in which the indicator C is extended to be displayed, the user input unit 130 may detect a tapping or long pressing gesture of one of page indicators included in the indicator C. In this case, the controller 180 may identify a page indicator associated with the tapping or long pressing gesture.

With reference to FIG. 5C, the controller 180 may control the display unit 151 to display a page corresponding to an identified page indicator. In this case, the selected indicator C is moved to the center, and accordingly, the displaying of the other indicators B and D are adjusted.

Figure 6A:
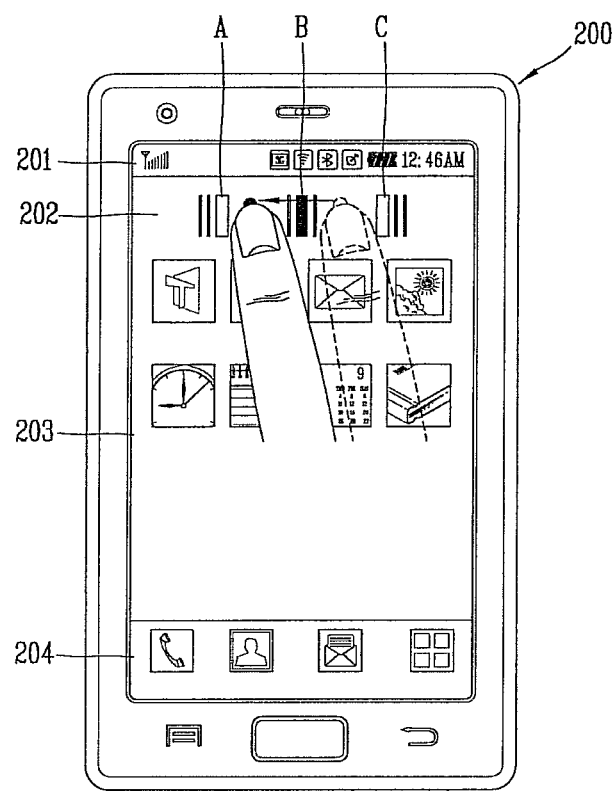
FIGS. 6A to 6C are overviews of display screens illustrating a process of changing a page according to a third embodiment of the present invention.
Figure 6B:
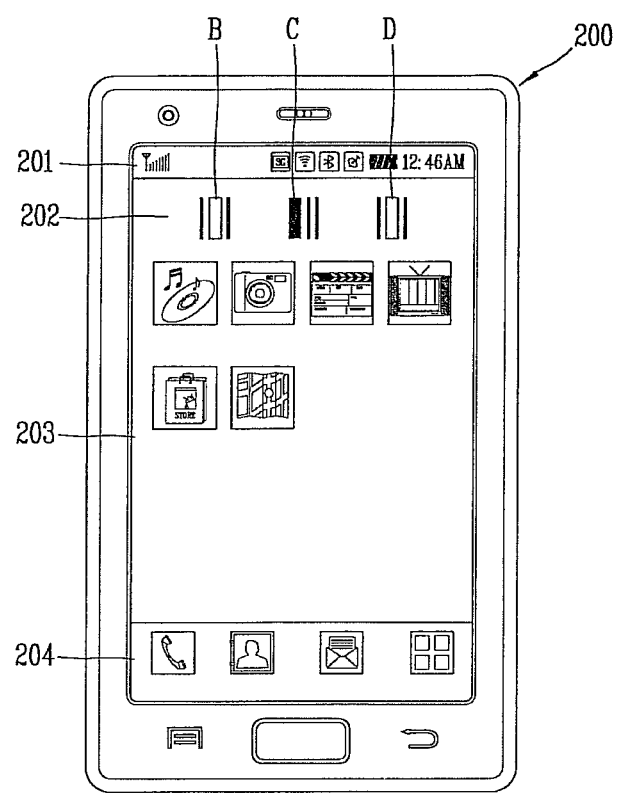
Figure 6C:
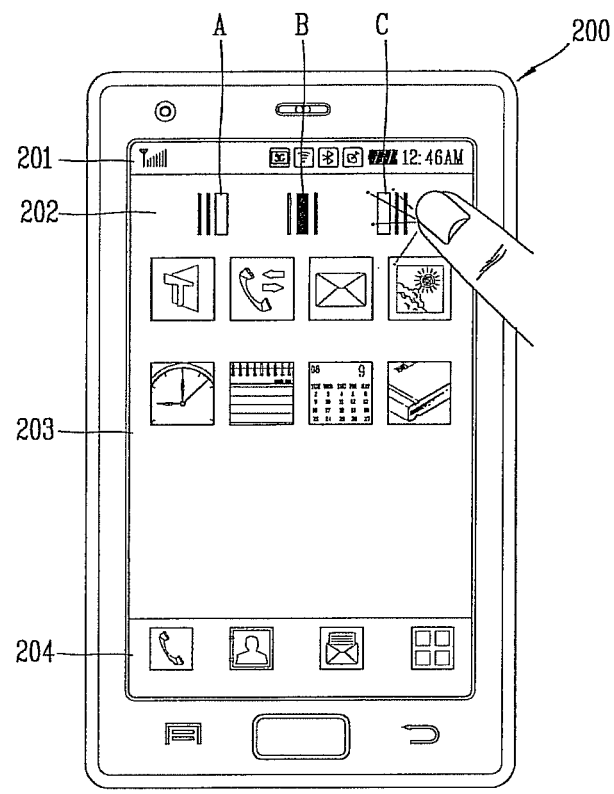

FIGS. 6A to 6C are overviews of display screens illustrating a process of changing a page according to a third embodiment of the present invention.

With reference to FIG. 6A, the user input unit 130 may detect a dragging (flicking or swiping) gesture of the indicator area 202. When the use input unit 130 detects a dragging (flicking or swiping) gesture of the indicator area 202, the controller 180 may interpret the dragging (flicking or swiping) gesture and determine the direction and speed (or acceleration) of the gesture. Also, the controller 180 may determine a page group including pages to be displayed on the page display area 203 based on the direction and speed of the gesture and check a page (i.e., a page representing the determined page group) to be displayed on the page display area 203 among the plurality of pages included in the determined page group.

With reference to FIG. 6B, the controller 180 may display the determined page on the page display area 203. At the same time, the indicator C indicating the page group including the displayed page is moved to the center, and accordingly, the displaying of the other indicators B and D is adjusted.

With reference to FIG. 6C, the user input unit 130 may detect a tapping or long pressing gesture of the indicator area 202. When the user input unit 130 detects the tapping or long pressing gesture of the indicator area 202, the controller 180 may interpret the detected gesture and determine the area to which the gesture was applied. Also, the controller 180 may determine a page group including pages to be displayed on the page display area 203 based on the area to which the gesture was applied, and determine a page to be displayed on the page display area 203 among the plurality of pages included in the determined page group.

With reference to FIG. 6B, the controller 180 may display the determined page on the page display area 203. At the same time, the indicator C indicating the page group including the displayed page is moved to the center, and accordingly, the displaying of the other indicators B and D is adjusted.

Figure 7A:
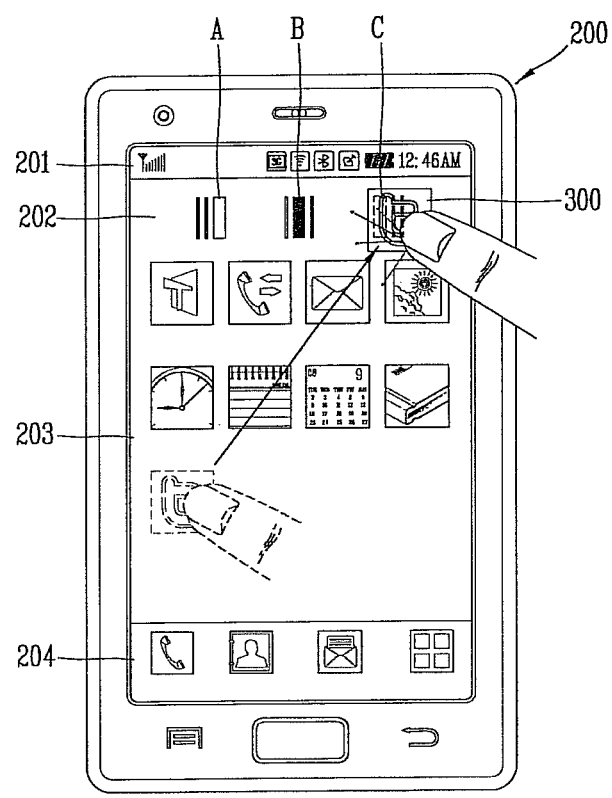
FIGS. 7A and 7B are overviews of display screens illustrating a process of changing a page according to a fourth embodiment of the present invention.
Figure 7B:
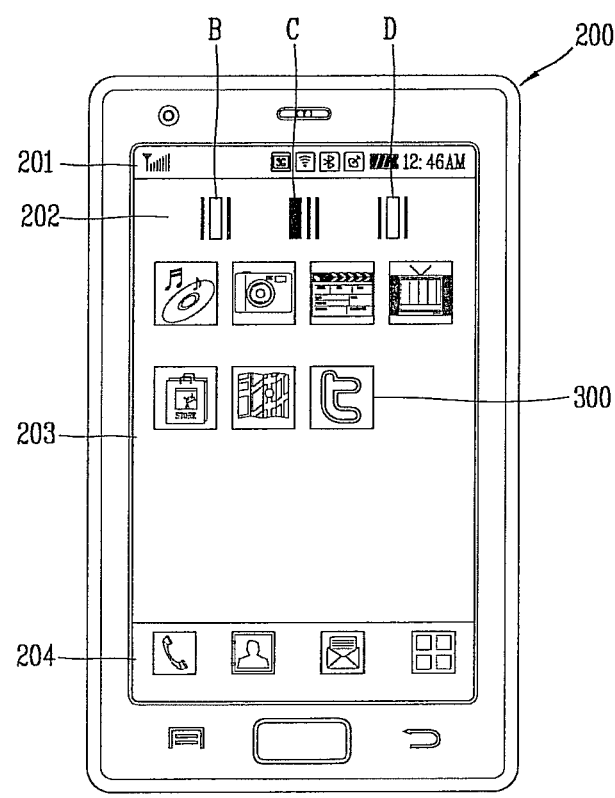

FIGS. 7A and 7B are overviews of display screens illustrating a process of changing a page according to a fourth embodiment of the present invention.

With reference to FIG. 7A, the user input unit may detect a gesture of drag and dropping one object 300 among objects displayed on the page display area 203 to the indicator C. When the user input unit 130 detects the gesture of drag and dropping the object 300 to the indicator C, the controller 180 interprets the drag and dropping gesture and identify a page group corresponding to the object 300 and the indicator C. Subsequently, the controller 180 may determine a page (e.g., a page representing the identified page group) to which the object 300 is to be moved among the plurality of pages included in the identified page group.

With reference to FIG. 7B, the controller 180 may display the determined page on the page display area 203. At the same time, the indicator C indicating the page group including the displayed page is moved to the center, and accordingly, the displaying of the other indicators B and D is adjusted. Also, the object 300 included in the page displayed on the page display area 203 in FIG. 7A may be moved to the page displayed on the page display area in FIG. 7B.

Meanwhile, with reference to FIG. 7A, when the indicators A, B, and C are indicators indicating pages, the controller 180 may interpret drag and dropping gesture and determine a page corresponding to the object 300 and the indicator C as a page to which the object 300 is to be moved. And, with reference to FIG. 7B, the controller 180 displays the determined page on the page display area 203 and the object 300 included in the page displayed on the page display area 203 in FIG. 7A to the page displayed on the page display area 203 in FIG. 7B.

Figure 8A:
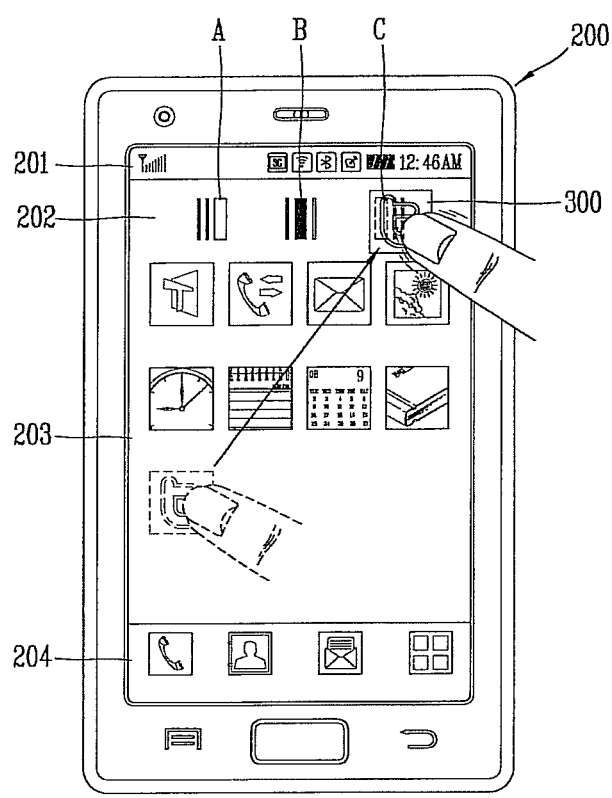
FIGS. 8A to 8C are overviews of display screens illustrating a process of changing a page according to a fifth embodiment of the present invention.
Figure 8B:
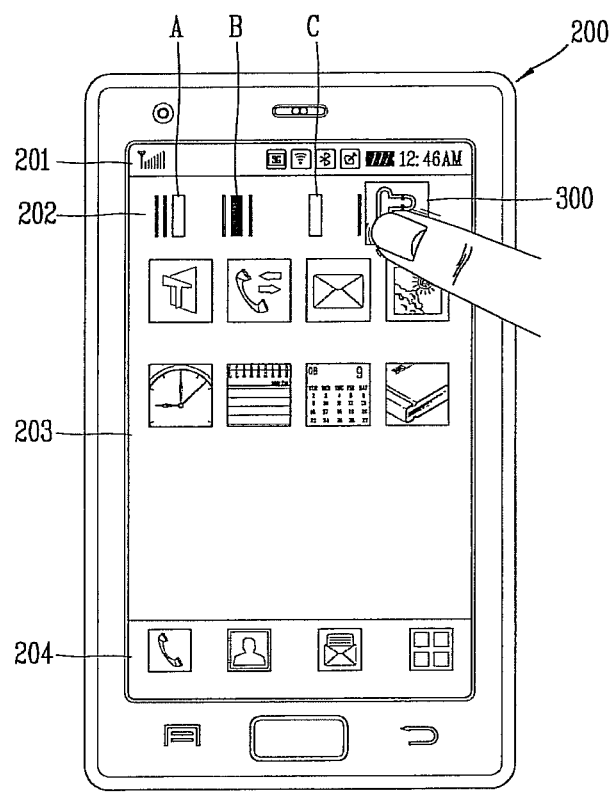
Figure 8C:
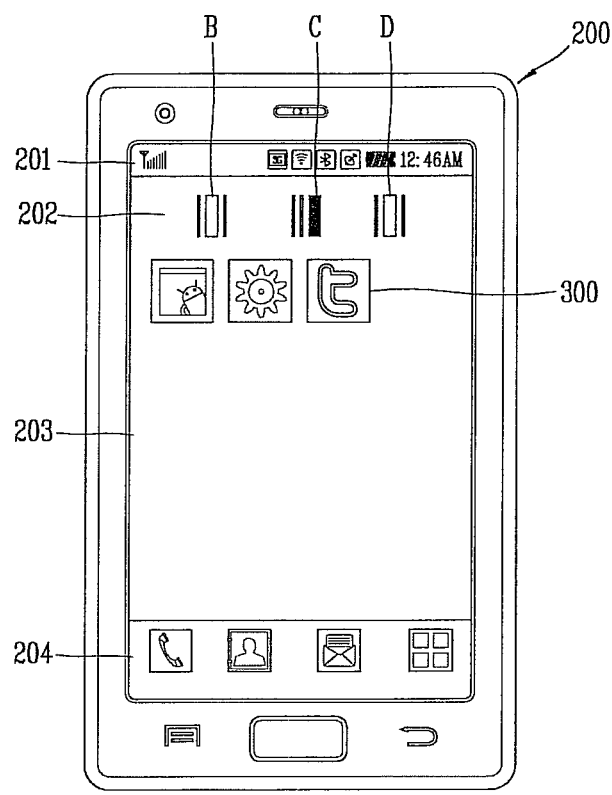

FIGS. 8A to 8C are overviews of display screens illustrating a process of changing a page according to a fifth embodiment of the present invention.

With reference to FIG. 8A, the user input unit 130 may detect a gesture of dragging one object 300 among objects displayed on the page display area 203 to the indicator C. When the user input unit 130 detects the gesture of dragging the object 300 to the indicator C, the controller 180 interprets the dragging gesture and identify a page group corresponding to the object 300 and the indicator C. Subsequently, the controller 180 may determine a page to be displayed on the page display area 203 among a plurality of pages included in the identified page group.

With reference to FIG. 8B, the user input unit 130 may detect a gesture of long pressing the indictor C in a state of dragging the object 300. When the user input unit 130 detects the gesture of long pressing the indicator C in the state of dragging the object 300, the controller 180 may interpret the long pressing gesture and display the indicator C in a magnified or extended manner. In this case, the page determined in FIG. 8A may be displayed on the page display area 203.

In this state, the user input unit 130 may detect a gesture of dropping the object 300 to one of indicators included in the indicator C. When the user input unit 130 detects the gesture of dropping the object 300 to one of the indicators included in the indicator C, the controller 180 may interpret the dropping gesture and determine a page to which the object 300 is to be moved based on the dropping gesture.

With reference to FIG. 8C, the controller 180 may display the determined page on the page display area 203. At the same time, the indicator C indicating the page group including the displayed page is moved to the center, and accordingly, the displaying of the other indicators B and D is adjusted. Also, the object 300 included in the page displayed on the page display area 203 in FIG. 8A may be moved to the page displayed on the page display area in FIG. 8C.

Figure 9A:
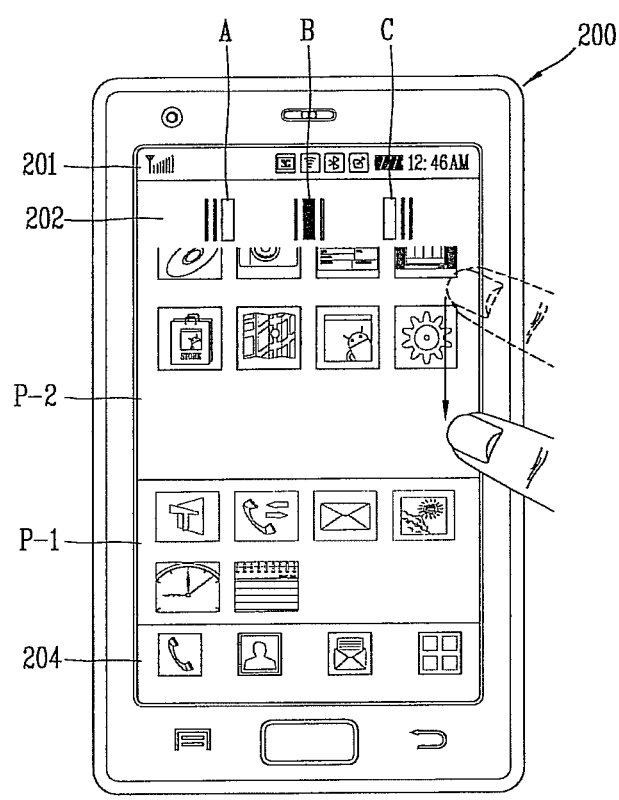
FIGS. 9A and 9B are overviews of display screens illustrating a multi-dimensional page dividing function according to an embodiment of the present invention.
Figure 9B:
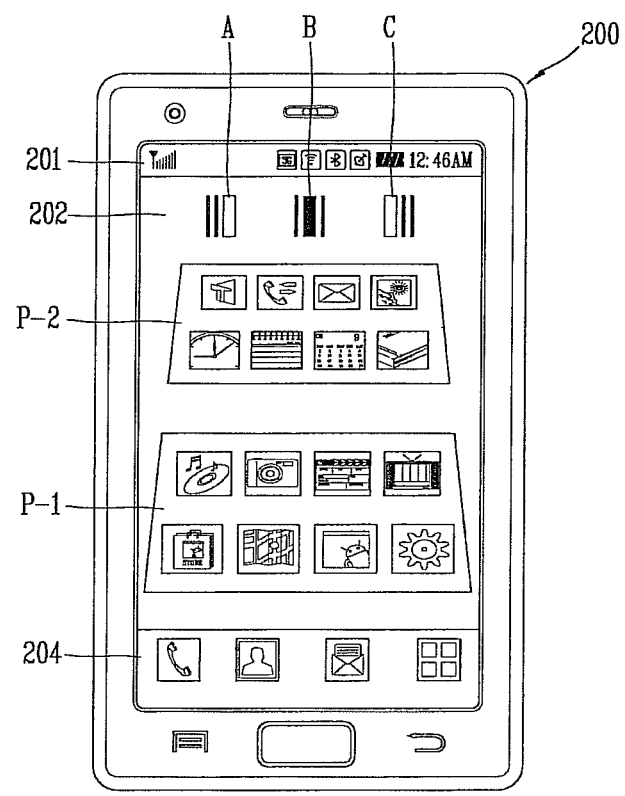

FIGS. 9A and 9B are overviews of display screens illustrating a multi-dimensional page dividing function according to an embodiment of the present invention.

With reference to FIG. 9A, the user input unit 130 may detect a dragging (flicking or swiping) gesture in a vertical direction on the page display area 203. When the user input unit 130 detects the dragging (flicking or swiping) gesture in the vertical direction on the page display area 203, the controller 180 may interpret the dragging (flicking or swiping) gesture and display a page P-2 which is included in the same page group as a currently displayed page P-1 and adjacent to the page P-1. At the same time, the displaying of the indicator B may be changed. For example, the indicator B, which indicates the page occupying the largest area of the current screen, may be displayed to be discriminated from an indicator of a different page.

With reference to FIG. 9B, the sensing unit 140 may include an acceleration sensor, and detect a tilt of the mobile terminal 100 through the acceleration sensor. The controller 180 may interpret the detected tilt and simultaneously display a plurality of pages included in the same page group as that of the currently displayed page P-1 based on the detected tilt. At the same time, the displaying of the indicator B may be changed. For example, the indicator B, which indicates the page occupying the largest area of the current screen, may be displayed to be discriminated from an indicator of a different page.

In particular, in this case, the controller 180 may display the page three-dimensionally according to the tilt of the mobile terminal 100. For example, as the mobile terminal 100 is becoming slanted more and more in a state of being stood, more pages may be displayed. Also, in this case, pages displayed at a lower end of the screen may be displayed to be larger than those displayed at an upper end of the screen. Also, the pages may be displayed to be stood as the mobile terminal 100 is slanting more and more, in order to maintain the angle at which the pages are displayed.

Figure 10A:
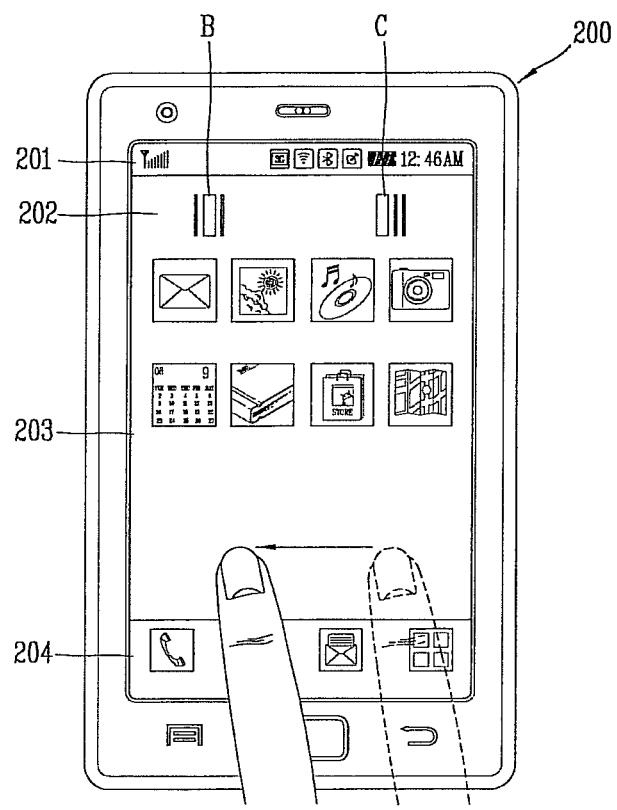
FIGS. 10A and 10B are overviews of display screens illustrating a multi-dimensional page dividing function according to an embodiment of the present invention.
Figure 10B:
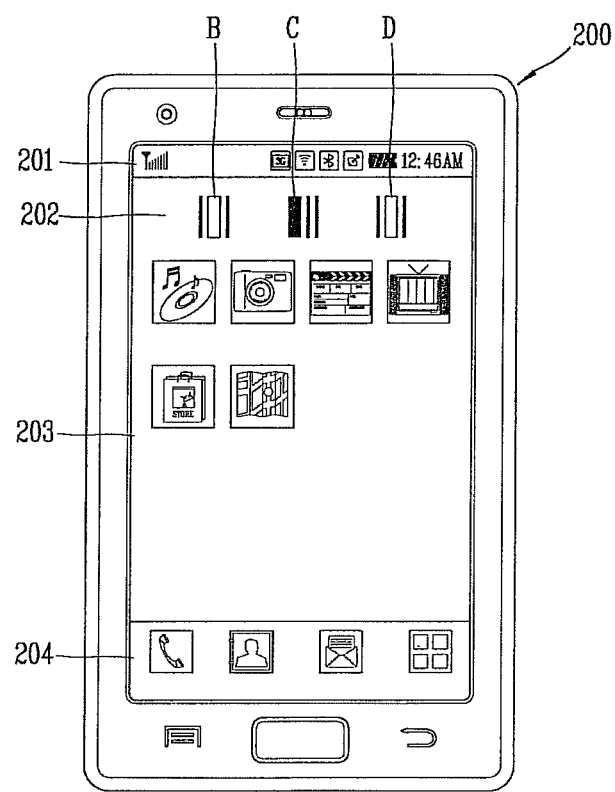

FIGS. 10A and 10B are overviews of display screens illustrating a multi-dimensional page dividing function according to an embodiment of the present invention.

With reference to FIG. 10A, the user input unit 130 may detect a dragging (flicking or swiping) gesture in a horizontal direction on the page display area 203. When the user input unit 130 may detect a dragging (flicking or swiping) gesture in a horizontal direction on the page display area 203, the controller 180 may interpret the dragging (flicking or swiping) gesture and determine the direction and speed (or acceleration) of the gesture. Also, the controller 180 may determine a page group to be displayed on the page display area 203 based on the direction and speed of the gesture, and then determine a page to be displayed on the page display area 203 among the plurality of pages included in the determined page group.

With reference to FIG. 10B, the controller 180 may display the determined page on the page display area 203. At the same time, the indicator C indicating the page group including the displayed page is moved to the center, and accordingly, the displaying of the other indicators B and D is adjusted.

According to embodiments of the present invention, pages in page groups can be smoothly changed through indicators indicating each page group in the mobile terminal. Thus, in the mobile terminal having the multi-dimensional page dividing function, the user can utilize the page changing function by intuition. Also, the user can easily and conveniently perform various functions related to changing of pages such as movement of an object, or the like, by using indicators.

In the embodiments of the present invention, the above-described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The mobile terminal and the method for controlling the operation of the mobile terminal according to the embodiments of the present disclosure is not limited in its application of the configurations and methods, but the entirety or a portion of the embodiments can be selectively combined to be configured into various modifications.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:
1. A mobile terminal comprising:
a display unit configured to display a first indicator indicating a first page group including a plurality of first pages, and to display a second indicator indicating a second page group including a plurality of second pages, wherein the displayed first indicator includes a plurality of page indicators representing each of the plurality of first pages and the displayed second indicator includes a plurality of page indicators representing each of the plurality of second pages;

an input unit configured to detect a gesture associated with the first indicator; and a controller configured to control the display unit to display a page representing the first page group, wherein the first indicator discriminately displays the page indicator of the page representing the first page group differently than the page indicator of another page of the first page group, and wherein the second indicator discriminately displays the page indicator of a page representing the second page group differently than the page indicator of another page of the second page group.

2. The mobile terminal of claim 1, wherein the page representing the first page group is a page that has been most recently displayed among the plurality of first pages.

3. The mobile terminal of claim 1, wherein the first indicator reflects a position of each of the pages of the plurality of first pages.

4. The mobile terminal of claim 1, wherein the detected gesture is a tap or a long press gesture with respect to the first indicator.

5. The mobile terminal of claim 1, wherein the controller controls the display unit to display the first indicator in a magnified or extended manner in response to the detected gesture.

6. The mobile terminal of claim 5, wherein the input unit detects a second gesture associated with the magnified or extended first indicator, and the controller controls the display unit to display a page of the first page group associated with the detected second gesture in response to the detected second gesture.

7. The mobile terminal of claim 1, wherein the detected gesture is a drag, flick, or a swipe gesture in an area in which the first indicator is displayed.

8. The mobile terminal of claim 1, further comprising:

a sensing unit configured to sense a tilt of the mobile terminal, wherein the controller controls the display unit to display the plurality of first pages based on the sensed tilt.

9. The mobile terminal of claim 1, wherein the controller controls the display unit to display a second page included in a first page group along with the first indictor.

10. The mobile terminal of claim 9, wherein the gesture is further associated with an object included in the second page, and the controller controls the display unit to display the object such that it is included in the page that represents the first page group.

11. The method of claim 1, wherein the page indicator of the page representing the first page group is discriminately displayed with respect to the page indicator of the page representing the second page group.

12. A method for changing a page of a mobile terminal, the method comprising:

displaying a first indicator indicating a first page group, wherein the displayed first indicator includes a plurality of first page indicators representing each of a plurality of first pages of the first page group;

displaying a second indicator indicating a second page group, wherein the displayed second indicator includes a plurality of second page indicators representing each of a plurality of second pages of the second page group;

detecting a gesture associated with the first indicator; and displaying a page representing the first page group in response to the detected gesture associated with the first indicator, wherein the first indicator discriminately displays the page indicator of the page representing the first page group differently than the page indicator of another page of the first page group, and wherein the second indicator discriminately displays the page indicator of a page representing the second page group differently than the page indicator of another page of the second page group.

13. The method of claim 12, wherein the page representing the first page group is a page that has been most recently displayed among the plurality of first pages.

14. The method of claim 12, wherein the first indicator reflects a position or order of each of the plurality of first pages of the first page group.

15. The method of claim 12, wherein the displaying of the page representing the first page group comprises:

displaying the first indicator in a magnified or extended manner in response to the detected gesture.

16. The method of claim 15, wherein the displaying of the page representing the first page group further comprises:

detecting a second gesture in the magnified or extended first indicator; and displaying a page of the first page group associated with the detected second gesture in response to the detected second gesture.

17. The method of claim 12, wherein the displaying of the first indicator comprises:

displaying a second page included in the first page group along with the first indicator.

18. The method of claim 17, wherein the gesture is further associated with an object included in the second page, and the displaying of the page representing the first page group comprises displaying the object such that it is included in the page representing the first page group in response to the detected gesture.

19. The method of claim 12, wherein the page indicator of the page representing the first page group is discriminately displayed with respect to the page indicator of the page representing the second page group.

20. A mobile terminal comprising:

a display unit configured to display a first indicator that indicates a first page group by including a plurality of first page indicators representing each of a plurality of first pages of the first page group, and the display unit to display, while displaying the first indicator, a second indicator that indicates a second page group by including a plurality of second page indicators representing each of a plurality of second pages of the second page group;

an input unit configured to detect a gesture associated with the first indicator; and a controller configured to control the display unit to display a page representing the first page group, and to display the first indicator such that the page indicator of the displayed page is displayed differently than the page indicator of another page of the first page group, and the controller to control the display of the second indicator such that the page indicator of a page representing the second page group is displayed differently than the page indicator of another page of the second page group.

* * * * *